US012798108B2

(12) United States Patent
Nishiyama et al.

(10) Patent No.: US 12,798,108 B2
(45) Date of Patent: Nov. 17, 2026

(54) APPARATUS FOR GENERATING MOTION CONTROL DATA FOR A ROBOT FOR NONVERBAL COMMUNICATION AND CORRESPONDING ROBOT

(71) Applicant: Sony Group Corporation, Tokyo (JP)

(72) Inventors: Mariko Nishiyama, Kanagawa (JP); Anja Pflug, Stuttgart (DE); Gonzalo Bailador Del Pozo, Madrid (ES)

(73) Assignee: Sony Group Corporation, Tokyo (JP)

( * ) Notice: Subject to any disclaimer, the term of this patent is extended or adjusted under 35 U.S.C. 154(b) by 78 days.

(21) Appl. No.: 18/842,399

(22) PCT Filed: Mar. 1, 2023

(86) PCT No.: PCT/EP2023/055173
§ 371 (c)(1),
(2) Date: Aug. 29, 2024

(87) PCT Pub. No.: WO2023/174693
PCT Pub. Date: Sep. 21, 2023

(65) Prior Publication Data

US 2025/0178209 A1 Jun. 5, 2025

(30) Foreign Application Priority Data

Mar. 18, 2022 (EP) .................................... 22163018

(51) Int. Cl.
*B25J 11/00* (2006.01)
*G06F 3/01* (2006.01)

(52) U.S. Cl.
CPC .......... *B25J 11/0005* (2013.01); *G06F 3/011* (2013.01)

(58) Field of Classification Search
CPC ...... B25J 11/0005; B25J 11/00; B25J 9/1689; G06F 3/011; G05B 2219/40142; G05B 2219/40146
See application file for complete search history.

(56) References Cited

U.S. PATENT DOCUMENTS 9,552,056 B1 1/2017 Barry et al.
9,604,029 B2 3/2017 Alamos et al.
(Continued)

FOREIGN PATENT DOCUMENTS

CN 103405093 B 9/2015
CN 105832073 A 8/2016
(Continued)

OTHER PUBLICATIONS

International Search Report and Written Opinion mailed on Jun. 7, 2023, received for PCT Application PCT/EP2023/055173, filed on Mar. 1, 2023, 14 pages.
(Continued)

*Primary Examiner* — Khoi H Tran
*Assistant Examiner* — Sagar Kc
(74) *Attorney, Agent, or Firm* — Xsensus LLP

(57) ABSTRACT

An apparatus for generating motion control data for a robot is provided. The apparatus comprises input interface circuitry configured to receive first input data indicative of a target motion to be performed by a robot arm of the robot relative to a first user and receive second input data indicative of a breathing motion pattern of a second user. The apparatus further comprises processing circuitry configured to modify the target motion based on the breathing motion pattern and generate the motion control data, wherein the motion control data are indicative of the modified target motion. The apparatus further comprises output interface circuitry configured to output the motion control data.

18 Claims, 13 Drawing Sheets

(56) References Cited

U.S. PATENT DOCUMENTS

| | | | | |
|---|---|---|---|---|
| 10,390,730 | B1 | 8/2019 | Shoeb | |
| 2007/0117076 | A1* | 5/2007 | Gordon | G09B 23/28 434/262 |
| 2009/0055019 | A1* | 2/2009 | Stiehl | B25J 9/1671 901/17 |
| 2011/0306873 | A1* | 12/2011 | Shenai | A61B 8/0841 600/424 |
| 2016/0249993 | A1* | 9/2016 | Farahmand | A61B 34/76 74/89.23 |
| 2017/0042626 | A1* | 2/2017 | Egorov | A61B 34/10 |
| 2017/0195624 | A1* | 7/2017 | Linden | G09B 19/00 |
| 2018/0015303 | A1 | 1/2018 | Fishman | |
| 2018/0110573 | A1* | 4/2018 | Kostrzewski | B25J 15/0019 |
| 2020/0167631 | A1* | 5/2020 | Rezgui | B25J 9/0084 |
| 2021/0316462 | A1 | 10/2021 | Manepalli et al. | |
| 2022/0093000 | A1* | 3/2022 | Munich | G06F 16/90332 |
| 2022/0238235 | A1* | 7/2022 | Shelton, IV | A61B 10/0012 |

FOREIGN PATENT DOCUMENTS

| | | | |
|---|---|---|---|
| CN | 205540653 | U | 8/2016 |
| CN | 111012132 | A | 4/2020 |
| CN | 111590600 | A | 8/2020 |
| WO | 2022/200052 | A1 | 9/2022 |

OTHER PUBLICATIONS

Denise Ngo, “New gadget could transform long-distance love”, Available online @ https://www.yourtango.com/201085428/new-gadget-could-transform-long-distance-love, Oct. 21, 2010, pp. 1-5.

Melissa Quintanilha, “The hug shirt”, Available online @ https://interactionthesis.wordpress.com/2007/10/10/the-hug-shirt/, Oct. 10, 2007, pp. 1-3.

Sakamoto et al., “Android as a Telecommunication Medium with a Human-like Presence”, Mar. 8-11, 2007, pp. 193-200.

Conrad B et al., “Speech and respiration”, Medline/NLM, Bethesda, MD, US, XP002809330, Database Accession No. NLM454139, Abstract & Archiv Fur Psychiatrie Und Nervenkrankheiten, vol. 226, No. 4, Apr. 12, 1979, 2 pages.

Yasuma et al., “Respiratory Sinus Arrhythmia Why Does the Heartbeat Synchronize With Respiratory Rhythm?”, opinion/hypotheses, Feb. 2004, pp. 683-690.

Al-Khalidi et al., “Respiration rate monitoring methods: A review”, DOI: 10.1002/ppul.21416, Jan. 31, 2011, 7 pages.

Somnox, A Smarter Way to Sleep, Somnox 2 Breathe & Sleep Companion | Breathe, Relax, Sleep, Available onnline @ https://somnox.com/sleep-robot/, retrieved on Jul. 16, 2024, 19 pages.

Ingrid Fadelli, “HuggieBot 2.0: A soft and human-size robot that hugs users on request”, Feb. 11, 2021, pp. 1-4.

Zheng et al., “Modeling the Timing and Duration of Grip Behavior to Express Emotions for a Social Robot”, IEEE Robotics and Automation Letters, IEEE, vol. 6, No. 1, Jan. 1, 2021, pp. 159-166.

Chen et al., “CP-Robot: Cloud-Assisted Pillow Robot for Emotion Sensing and Interaction”, Aug. 18, 2016, pp. 81-93.

Chen et al., “Emotion Communication System”, Special Section on Emotion-Aware Mobile Computing, vol. 5, Feb. 25, 2017, pp. 326-337.

Okubo et al., “Intimate Touch Conversation through teleoperated android: Toward enhancement of interpersonal closeness in elderly people”, Proceedings of the 27th IEEE International Symposium on Robot and Human Interactive Communication, Aug. 27-31, 2018, pp. 23-28.

Yamazaki et al., “Teleoperated Android as an Embodied Communication Medium: A Case Study with Demented Elderlies in a Care Facility”, The 21st IEEE International Symposium on Robot and Human Interactive Communication, Sep. 9-13, 2012, pp. 1066-1071.

Iwaki et al., “A basic study of a pillow-shaped haptic device using a pneumatic actuator”, Proceeding of the 5th International Symposium on Mechatronics and its Applications (ISM08), Amman, Jordan, May 27-29, 2008, 6 pages.

BZ the Voice of Berlin, “Artificial mother for premature babies Pillow simulates mom’s breathing, temperature and heart rate”, Jun. 22, 2018, Area: Tempelhof-Schöneberg, Topic: Current Berlin News, Germany, 18 pages. https://www.bz-berlin.de/berlin/tempelhof-schoeneberg/kissen-simuliert-mamas-atmung-temperatur-und-herzfrequenz.

* cited by examiner

APPARATUS FOR GENERATING MOTION CONTROL DATA FOR A ROBOT FOR NONVERBAL COMMUNICATION AND CORRESPONDING ROBOT

CROSS-REFERENCE TO RELATED APPLICATIONS

The present application is based on PCT filing PCT/EP2023/055173, filed Mar. 1, 2023, which claims priority from European Patent Application No. 22163018.9, filed Mar. 18, 2022, the entire contents of each are incorporated herein by reference.

FIELD

The present disclosure relates to motion control. Examples of the present disclosure relate to an apparatus and a method for generating motion control data for a robot, a robot and a method for controlling a robot.

BACKGROUND

For instance, a robot can imitate a motion of a person to convey an impression of the person being present to another person. The imitated motion can appear artificial to the receiving person. Hence, there may be a demand for improved motion control of a robot.

SUMMARY

This demand is met by apparatuses and methods in accordance with the independent claims. Advantageous embodiments are addressed by the dependent claims.

According to a first aspect, the present disclosure relates to an apparatus for generating motion control data for a robot. The apparatus comprises input interface circuitry configured to receive first input data indicative of a target motion to be performed by a robot arm of the robot relative to a first user and receive second input data indicative of a breathing motion pattern of a second user. The apparatus further comprises processing circuitry configured to modify the target motion based on the breathing motion pattern and generate the motion control data, wherein the motion control data are indicative of the modified target motion. The apparatus further comprises output interface circuitry configured to output the motion control data.

According to a second aspect, the present disclosure relates to a robot comprising a robot arm. The robot further comprises input interface circuitry configured to receive motion control data indicative of a target motion to be performed by the robot arm relative to a first user, wherein the target motion correlates with a breathing motion pattern of a second user. The robot further comprises control circuitry configured to control movement of the robot arm based on the target motion.

According to a third aspect, the present disclosure relates to a method for generating motion control data for a robot. The method comprises receiving first input data indicative of a target motion to be performed by a robot arm of the robot relative to a first user, receiving second input data indicative of a breathing motion pattern of a second user, modifying the target motion based on the breathing motion pattern, generating the motion control data, wherein the motion control data are indicative of the modified target motion, and outputting the motion control data.

According to a fourth aspect, the present disclosure relates to a method for controlling a robot. The method comprises receiving motion control data indicative of a target motion to be performed by the robot arm relative to a first user, wherein the target motion correlates with a breathing motion pattern of a second user. The method further comprises controlling movement of a robot arm of the robot based on the target motion.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
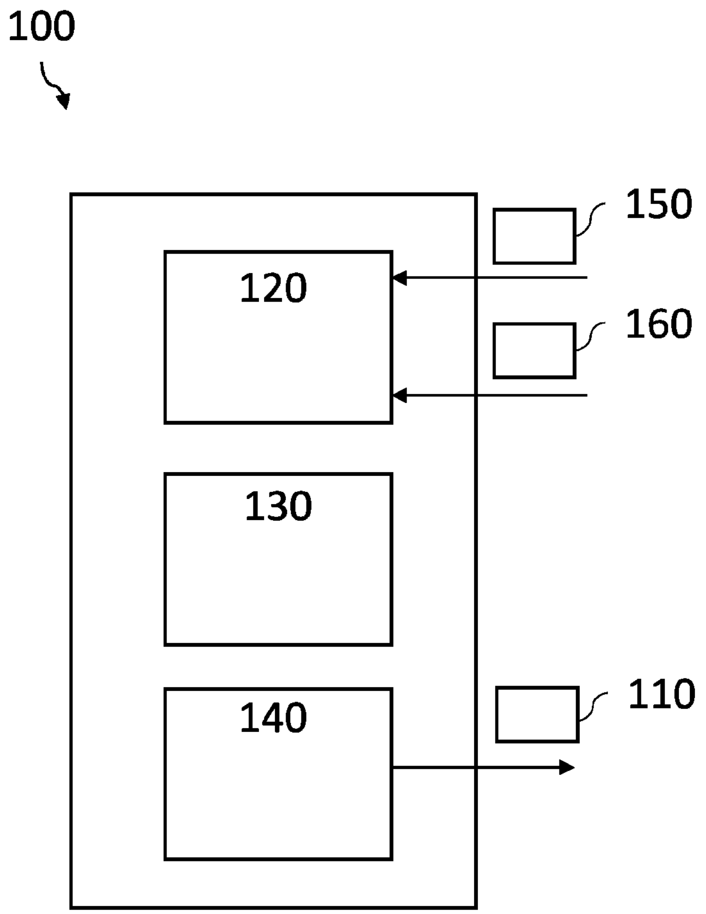
FIG. 1 illustrates an example of an apparatus for generating motion control data for a robot.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 illustrates an example of an apparatus 100 for generating motion control data 110 for a robot. The robot may be any physical system for automatically performing a movement relative to a first user. The robot comprises a robot arm which is controlled by a control circuitry based on the motion control data 110 to perform the movement. The robot may interact with the first user via touch or gesture, e.g., on behalf of a second user, i.e., the robot may function as a device for nonverbal remote communication between the first user and the second user. The robot may be operated to create an experience of touch for the first user by triggering a haptic stimulus, i.e., by applying a force, vibration, or motion to the first user. The movement of the robot arm may convey to the first user an impression of being haptically connected to another human, e.g., an impression of being hugged, stroked, caressed, or alike.

The apparatus 100 may be, for instance, a computing system or a subpart of a computing system. The computing system may include multiple constituent computing systems. Computing systems may, for example, be handheld devices (e.g., a smartphone), appliances, laptop computers, desktop computers, mainframes, distributed computer systems, datacenters, cloud server, or wearables (e.g., a smartwatch). The apparatus 100 may be integrated into the robot or be external from the robot.

The apparatus 100 comprises input interface circuitry 120, processing circuitry 130 and output interface circuitry 140. For example, the processing circuitry 130 may be a single dedicated processor, a single shared processor, or a plurality of individual processors, some of which or all of which may be shared, a digital signal processor (DSP) hardware, an application specific integrated circuit (ASIC) or a field programmable gate array (FPGA). The processing circuitry 130 may optionally be coupled to, e.g., read only memory (ROM) for storing software, random access memory (RAM) and/or non-volatile memory. The processing circuitry 130 is coupled to the input interface circuitry 120 and the output interface circuitry 140. The input interface circuitry 120 and the output interface circuitry 140 may implement an interface between two or more subparts of the apparatus 100 or between the apparatus 100 and an external computing system in order to exchange information.

The input interface circuitry 120 is configured to receive first input data 150 indicative of a target motion to be performed by a robot arm of the robot relative to a first user. The first user may be a human being or an animal which may benefit of a use of the robot. The target motion may indicate any voluntary motion of a human arm. The target motion may represent any gesture of the robot arm which is haptically or visually interpretable by the first user. For instance, the target motion may represent any motion which is interpretable as endearment by the first user. In some examples, the target motion may be an enclosing of an upper body of the first user with the robot arm or a movement of a robot hand of the robot arm along a surface of the first user, i.e., the target motion may mimic a hug of the first user or a caress (stroking) of a body part of the first user. In these cases, the apparatus 100 may aim at generating the motion control data 110 in such a way that a resulting target motion performed by the robot may comfort the first user, provide an immersive impression of receiving an endearment to the first user or strengthen a bonding between the first user and a second user which may remotely communicate via the robot. Further, the target motion may be a combination of several motions. For instance, the target motion may be a sequence of several motions to be performed by the robot, wherein one part of the sequence may represent a hug and a second part may represent a caress.

In some examples of the present disclosure, the target motion is a measured motion of a second user. The second user may have a device for, e.g., optically or using pressure sensors, measuring the motion of the second user. The device may then communicate the target motion to the apparatus 100. This may allow an adaption of the target motion to a specific or characteristic motion of the second user.

In some examples, the first input data 150 indicate at least one of a type of the target motion, a duration of the target motion and a target force to be applied on the first user by the robot arm. The type of the target motion, e.g., hug or caress, the duration of the target motion and the target force, i.e., an intensity of the target motion, may be determined based on a selection or setting of the second user. The second user may have a device for selecting or setting the type, duration or the target force, wherein the device may communicate the selection or settings to the apparatus 100.

The input interface circuitry 120 is further configured to receive second input data 160 indicative of a breathing motion pattern of a second user. The second input data 160 may be based on breathing measurement data indicating a course or flow of a breathing motion caused by respiratory system of the second user. For instance, the breathing motion pattern may indicate repetitive cycles of inhalation and exhalation of the respiratory system, a rate, speed, force, volume, phase, amplitude and/or periodic form of a breathing motion of the second user or an intensity distribution of the breathing motion over the body of the second user.

The respiratory system or another physiological system of the second user from which the breathing motion pattern is derivable may be measured by a device used by the second user. The device may then send the resulting breathing measurement data to the apparatus 100, e.g., via a computer network connecting the apparatus 100 and the device or a wired or wireless connection between those two. The breathing measurement data may, e.g., be optically captured by a camera oriented towards an upper body of the second user or be indirectly measured by a sensor such as blood oxygenation sensor, oxygen saturation sensor, inertial measurement sensor, laser Doppler flowmetry (LDF) sensor, and/or photoplethysmography (PPG) sensor. The second user may, e.g., wear a wristband equipped with one of the aforementioned sensors for recording the breathing measurement data. In some examples, the second input data 160 may be based on real-time measurement data which may be beneficial in case the apparatus 100 is intended for real-time transmission of the breathing motion pattern of the second user to the robot. The processing circuitry 120 may be configured to modify the breathing measurement data based on a breathing simulation model or based on smoothing, filtering, scaling or fusion of multiple breathing measurement data from several sensors.

The processing circuitry 130 is configured to modify the target motion based on the breathing motion pattern and generate the motion control data 110, wherein the motion control data 110 are indicative of the modified target motion. For instance, the processing circuitry 130 may modify a trajectory or speed of the target motion or a force of the target motion which is to be applied to the first user based on the breathing motion pattern. The processing circuitry 130 may adapt the target motion to a rhythm of the breathing motion pattern, i.e., it may vary the target motion based on inhalation and exhalation cycles of the breathing motion pattern. For instance, the motion control data 110 may be used to guide the robot arm to cyclically move up and down or cyclically increase and decrease a force to be applied to the first user while performing the target motion. In other words, the modified target motion may represent a combination of a voluntary arm motion (target motion) and an involuntary motion (breathing motion pattern). Therefore, the motion control data 110 may contribute to a more natural motion of the robot which gives the first user a more immersive impression of being connected with the second user.

For instance, the target motion and the breathing motion pattern may be respectively represented as time series of motion parameters, which the processing circuitry 130 may correlate or superimpose one with the other. The processing circuitry 130 may determine a common motion vector based on the target motion and the breathing motion pattern, i.e., integrate or convolve a vector or function representing the target motion with a vector or function representing the breathing motion pattern. In some examples, the processing circuitry 130 is configured to modify the target motion by convolving the target motion and the breathing motion pattern, i.e., the target motion is modified by applying a convolution function on the target motion and the breathing motion pattern.

In some examples, the target motion is to be performed by an actuator of the robot arm and the processing circuitry 130 is configured to modify the target motion based on a weighting of the breathing motion pattern. The weighting may correspond to a position of the actuator along the robot arm. In other words, the processing circuitry 130 may increase a degree of modification (weight) of the target motion depending on the position of the actuator. For instance, the processing circuitry 130 may scale the breathing motion pattern according to the weighting before convolving the target motion with the breathing motion pattern, in particular, the processing circuitry 130 may determine a scale multiplied to a vector representing the breathing motion pattern according to the weighting and modify the target motion based on the scaled vector. If the actuator is close to a robot chest (part of the robot representing a human-like chest part), the processing circuitry 130 may assign a relative high weight to the breathing motion pattern, i.e., an influence of the breathing motion pattern on the modification of the target motion may increase with a proximity of the actuator to the robot chest. The processing circuitry 130 may, e.g., increase a force to be applied on the first user according to the weighting. In case the robot arm comprises several actuators, the processing circuitry 130 may determine respective motion control data 110 based on a respective weight corresponding to a respective position of the actuators along the robot arm, e.g., such that an impact of the breathing motion pattern on the modification of the target motion is the higher the closer a corresponding actuator is to the robot chest.

The output interface circuitry 140 is configured to output the motion control data 110. The output interface circuitry 140 may, e.g., send the motion control data 110 to the robot via any communication channel. The output interface circuitry 140 may, e.g., have a wired or wireless connection to a computer or mobile network and send the motion control data 110 via the network to the robot. Alternatively, the output interface circuitry 140 may provide the motion control data 110 to an input interface circuitry of the robot, e.g., in case the apparatus 100 is integrated into the robot. In some examples, the output interface circuitry 140 is further configured to output second motion control data indicative of the breathing motion pattern. This may be advantageous for further processing of the breathing motion pattern on the part of the robot.

Optionally, the input interface circuitry 120 may receive, in addition to the above-mentioned first input data 150 and second input data 160, further data indicating further vital parameters or phonation of the second user or information about the first user. This data may be processed by the apparatus 100 to further modify the target motion or to communicate the data to the robot. Some examples for the apparatus 100 using further input data are explained in more detail below.

In some examples, the input interface circuitry 120 is further configured to receive third input data indicative of a phonation of the second user and the processing circuitry 130 is further configured to modify the breathing motion pattern based on the phonation prior to modifying the target motion. The third input data may be an audio signal, for instance. The phonation of the second user may, e.g., be speech (utterance), vocalization or any other sound produced by a vocal tract of the second user. The third input data may, e.g., be an audio record of the second user. The processing circuitry 130 may modify the breathing motion pattern by adapting a periodic component of the breathing motion pattern to perturbations caused by phonation of the second user. This may allow an improved real-time emulation of the breathing motion of the second user.

For instance, the processing circuitry 130 may be configured to adapt the breathing motion pattern to the phonation such that fluctuations of a breathing motion caused by phonation or phonation breaks are imitated. The breathing motion pattern may be adapted such that a time interval of a phonation break matches a time interval of an inhalation section of the breathing motion pattern.

For instance, the processing circuitry 130 may determine a breathing section (inhalation/exhalation) and/or a breathing frequency of the breathing motion pattern and synchronize the section and/or frequency with the phonation. The processing circuitry 130 may coordinate and/or correlate between the breathing motion pattern and the phonation. The processing circuitry 130 may modify the breathing motion pattern based on at least one of a phase shift, a delay, a positive or negative pulse superimposed on the breathing motion pattern, an increase in amplitude, a decrease in amplitude, an increase in frequency, or a decrease in frequency.

In some examples, where the breathing motion pattern comprises an exhalation section, the processing circuitry 130 is configured to modify the breathing motion pattern by correlating a duration of the exhalation section with a duration of the phonation, i.e., the processing circuitry 130 may modify the breathing motion pattern such that its exhalation section coincides with a duration of an utterance of the second user. For example, if the processing circuitry 130 determines that phonation is present (i.e., the second user makes a sound) at a certain time instance based on the third input data, a corresponding exhalation phase of the breathing motion pattern (at the same time instance) may be extended and/or a subsequent inhalation section of the breathing motion pattern may be delayed. Alternatively/additionally, the processing circuitry 130 may modulate an inhalation section of the breathing motion pattern which is scheduled subsequent to an utterance. The inhalation section may be modified in the sense that an intensity, volume of the inhalation section is higher, which may mimic a deeper inhalation due to preceding phonation.

In some examples, the processing circuitry 130 is further configured to determine, based on the third input data, at least one of a predicted phonation and a predicted phonation break using a trained machine learning model, and wherein the processing circuitry 130 is further configured to modify the breathing motion pattern based on the at least one of the predicted phonation and the predicted phonation break. The processing circuitry 130 may predict, e.g., a beginning of an utterance, an end of an utterance, and/or a length of an utterance of the second user. The processing circuitry 130 may use the machine learning model to determine a realistic simulation of a breathing motion of the second user, e.g., periodicity, amplitude, phase, and/or modulations based on the phonation (such as frequency shifts, phase shifts, delays, superimposed pulses, and/or changes in amplitude of the breathing motion). The processing circuitry 130 may determine the predicted phonation and/or the predicted phonation break based on processing the breathing motion pattern and on analytics of the phonation. The processing circuitry 130 may use speech analysis, such as speech break prediction (and/or phonation break prediction) to model and/or predict the breathing motion pattern of the second user, e.g., periodicity and/or form of the breathing motion pattern. Alternatively/additionally, the processing circuitry 130 may use speech recognition to determine modulations to be applied to the breathing motion pattern. For example, particular phrases of the phonation may be correlated with certain variations of the breathing motion pattern.

As used herein, the term "machine learning model" refers to a data structure and/or set of rules representing a statistical model that the processing circuitry 130 uses to perform the prediction tasks mentioned above without using explicit instructions, instead relying on models and inference. The data structure and/or set of rules represents learned knowledge (e.g., based on training performed by a machine-learning algorithm). For example, in machine-learning, instead of a rule-based transformation of data, a transformation of data may be used, that is inferred from an analysis of historical and/or training data. In the proposed technique, the content of data indicating a phonation and/or a breathing motion pattern is analyzed using the machine-learning model (i.e., a data structure and/or set of rules representing the model).

The machine-learning model is trained by a machine-learning algorithm. The term "machine-learning algorithm" denotes a set of instructions that are used to create, train or use a machine-learning model. For the machine-learning model to analyze the content of the data, the machine-learning model may be trained using training and/or historical data as input and training content information (e.g., labels indicating a beginning or end of an utterance) as output. By training the machine-learning model with a large set of training data and associated training content information (e.g., labels or annotations), the machine-learning model "learns" to recognize the content of the data, so the content of the data that are not included in the training data can be recognized using the machine-learning model. By training the machine-learning model using training data and a desired output, the machine-learning model "learns" a transformation between the data and the output, which can be used to provide an output based on non-training data provided to the machine-learning model.

The machine-learning model may be trained using training input data (e.g., training data). For example, the machine-learning model may be trained using a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. For example, a training sample may comprise training data as input data and one or more labels as desired output data.

Apart from supervised learning, semi-supervised learning may be used. In semi-supervised learning, some of the training samples lack a corresponding desired output value. Supervised learning may be based on a supervised learning algorithm (e.g., a classification algorithm or a similarity learning algorithm). Classification algorithms may be used as the desired outputs of the trained machine-learning model are restricted to a limited set of values (categorical variables), i.e., the input is classified to one of the limited set of values (type of exercise, execution quality). Similarity learning algorithms are similar to classification algorithms but are based on learning from examples using a similarity function that measures how similar or related two objects are.

Apart from supervised or semi-supervised learning, unsupervised learning may be used to train the machine-learning model. In unsupervised learning, (only) input data are supplied, and an unsupervised learning algorithm is used to find structure in the input data such as training and/or historical data (e.g., by grouping or clustering the input data, finding commonalities in the data). Clustering is the assignment of input data comprising a plurality of input values into subsets (clusters) so that input values within the same cluster are similar according to one or more (predefined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such that the cumulative reward is increased, leading to software agents that become better at the task they are given (as evidenced by increasing rewards).

Furthermore, additional techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e., outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g., a set of input data indicating phonation of the second user) may be represented by the branches of the decision tree, and an output value corresponding to the item may be represented by the leaves of the decision tree. Decision trees support discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may, e.g., be used to store, manipulate or apply the knowledge.

For example, the machine-learning model may be an Artificial Neural Network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receive input values (e.g., the data indicating the phonation), hidden nodes that are (only) connected to other nodes, and output nodes that provide output values. Each node may represent an artificial neuron. Each edge may transmit information from one node to another. The output of a node may be defined as a (non-linear) function of its inputs (e.g., of the sum of its inputs). The inputs of a node may be used in the function based on a "weight" of the edge or of the node that provides the input. The weight of nodes and/or of edges may be adjusted in the learning process. In other words, the training of an ANN may comprise adjusting the weights of the nodes and/or edges of the ANN, i.e., to achieve a desired output for a given input.

Alternatively, the machine-learning model may be a support vector machine, a random forest model or a gradient boosting model. Support vector machines (i.e., support vector networks) are supervised learning models with associated learning algorithms that may be used to analyze data (e.g., in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection. In some examples, the machine-learning model may be a combination of the above examples.

In some examples, the input interface circuitry 120 is further configured to receive fourth input data indicative of a heartbeat pattern of the second user. The fourth input data may be based on heartbeat measurement data generated by, e.g., a wearable device used by the second user. The heartbeat measurement data may be recorded, for example, by a PPG or LDF sensor. The processing circuitry 130 may extract the heartbeat pattern from the heartbeat measurement data. The heartbeat pattern may indicate a heartbeat rate or rhythmicity. The processing circuitry 130 may determine a pulse vector indicating heartbeat pulses based on the heartbeat pattern. The processing circuitry 130 may modify the heartbeat pattern by adding (randomized) jitter to the pulse vector and smooth it to create a more natural simulation of a human heartbeat.

The processing circuitry 130 may be configured to modify the heartbeat pattern based on the breathing motion pattern and the output interface circuitry 140 may be further configured to output the modified heartbeat pattern. For instance, the processing circuitry 130 may be configured to synchronize the heartbeat pattern and the breathing motion pattern such that a certain number of heartbeat pulses occur within one breathing section of the breathing motion pattern. In some examples, where the breathing motion pattern comprises an inhalation section and an exhalation section, the processing circuitry 130 is configured to modify the heartbeat pattern by clinching (shrinking) a first part of the heartbeat pattern corresponding to the inhalation section and stretching a second part of the heartbeat pattern corresponding to the exhalation section. For instance, the second part may be temporally subsequent to the first part. Both parts may comprise at least one respective heartbeat pulse. The heartbeat pulse may be stretched or clinched by multiplying a factor to a function representing a temporal course of a heartbeat pulse. As a consequence, the clinched first part may represent a sequence of slowed down or elongated heartbeat pulses and the stretched second part may represent a sequence of accelerated or shortened heartbeat pulses. This may allow mimicking the effect of the baroreflex (i.e., a heartbeat rate increases during inhalation) for giving a simulation of a heartbeat or a simultaneous simulation of a heartbeat and a breathing motion a more natural appearance.

In some examples, the input interface circuitry 120 is further configured to receive fifth input data indicative of at least one of a motion of the first user, a position of the first user, a counterforce of the first user against the robot arm and settings of the first user. One or more sensor, e.g., integrated into the robot, may measure the motion, the position of the first user and/or the counterforce of the first user against the robot arm and generate measurement data based thereon which is then provided to the input interface circuitry 120. The input interface circuitry 120 may continuously (e.g., in real-time) receive an updated motion, position and/or counterforce of the first user measured by the sensor. The robot or a device used by the first user may provide a user interface which allows the first user to determine/select the settings and provide the settings to the input interface circuitry 120. The settings may, e.g., comprise information about a desired force to be applied to the first user, i.e., an intensity of a hug to be performed by the robot arm. The settings may comprise a threshold indicating a maximum force to be applied to the first user.

The processing circuitry 130 may be further configured to modify the target motion based on the fifth input data. The processing circuitry 130 may, for instance, adapt a force to be applied to the first user during the target motion or a speed of the target motion according to the settings and/or the counterforce of the first user against the robot arm. Further, the processing circuitry 130 may (continuously) adapt a trajectory of the target motion based on the position and/or motion of the first user. This may increase safety of a usage of the robot by the first user and may allow a generation of the motion control data 110 in consideration of an individual preference of the first user.

In some examples, the input interface circuitry 120 is further configured to receive sixth input data indicative of a target temperature to be regulated on by a heating device of the robot. The target temperature may correspond to an average value of the body temperature of a human or to a measured body temperature of the second user. In the latter case, a device used by the second user, e.g., a wearable, may comprise a sensor for measuring the body temperature of the second user and provide the measured body temperature (in form of the sixth input data) to the input interface circuitry 120. The output interface circuitry 140 may be further configured to output temperature control data indicative of the target temperature.

The apparatus 100 may enable a fine-tuning and adaption of motion control data for more realistic imitation of a motion of a living being. The apparatus 100 may adapt motion control data of a voluntary motion to a breathing motion pattern. Optionally, the apparatus 100 may process further data indicating physiological parameters like heartbeat or body temperature. The apparatus 100 may improve an authenticity of an interaction between a first user and the second user via the robot, e.g., for transferring a virtual touch from the second user to the first user.

Figure 2:
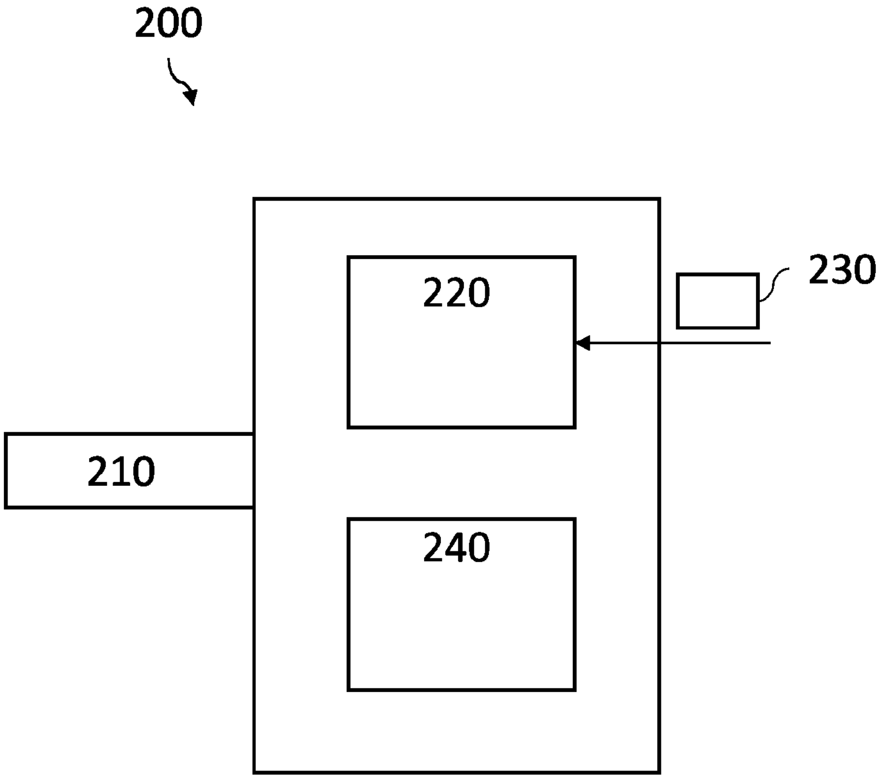
FIG. 2 illustrates an example of a robot.

FIG. 2 illustrates an example of a robot 200. The robot 200 may be any physical system for automatically performing a movement relative to a first user, as described with reference to FIG. 1. The robot 200 may have a soft form factor, i.e., have a soft and/or plush outer surface. For instance, the robot 200 may have a fabric outer layer. The robot 200 may be a pillow, toy, and/or a stuffed animal, for example. The robot 200 may have a human- or animal-like appearance.

The first user may be considered a receiver of a target motion to be performed by the robot arm 210. A second user may be considered a sender of the target motion.

The robot 200 comprises a robot arm 210. The robot 200 may include one or several actuator for moving the robot arm 210 and, optionally, other parts of the robot 200. The actuator may, e.g., be an electric, hydraulic, or pneumatic actuator. The robot arm 210 may be able to imitate a voluntary motion, such as hugging or stroking, as well as a breathing motion by periodically expanding and relaxing. The robot arm 210 may comprise a mechanical joint between the robot arm 210 and another part of the robot 200 (e.g., a robot chest) or between a first part of the robot arm 210 (e.g., an upper arm) and a second part of the robot arm 210 (e.g., a forearm). The joint may allow constrained relative movement of the robot parts for mimicking a natural movement of a living being, thus, the joint may impose a constraint to the relative movement corresponding to constraints which a joint of a living being would impose to a movement of the living being. Thus, the robot arm 210 may be designed for bending into predefined positions according to natural degrees of freedom of a corresponding joint of an arm of a living being.

The robot 200 further comprises input interface circuitry 220 configured to receive motion control data 230 indicative of a target motion to be performed by the robot arm 210 relative to a first user. The target motion correlates with a breathing motion pattern of a second user, i.e., the target motion exhibits a statistically relevant association with the breathing motion pattern. This association may be manifested, e.g., by an approximately periodic component in the course or intensity of the target motion. For instance, the target motion may have been determined based on convolution or cross-correlation of a predetermined voluntary motion (such as hugging or stroking) and the breathing motion pattern. The target motion is a "modified target motion", such as explained in detail with reference to FIG. 1. The motion control data 230 may, e.g., indicate a type of the target motion, a duration of the target motion and/or a target force to be applied on the first user by the robot arm 210. The motion control data 230 is generated by an apparatus for generating motion control data for the robot according to embodiments of the present disclosure, e.g., by apparatus 100. The target motion may be represented by a motion vector which is adapted to a breathing motion (represented by the breathing motion pattern), and optionally, to a phonation (speech) of the second user.

In some examples, the target motion is an enclosing of an upper body of the first user with the robot arm 210 and/or a movement of a robot hand of the robot arm 210 along a surface of the first user. The robot hand may be a hand-like physical part connected to an end of the robot arm 210 via a mechanical pair. The mechanical pair of the robot hand may have more degrees of freedom than a cubital joint of the robot arm 210 which may allow a fine-tuned motion control of the robot hand for mimicking stroking or holding hands. In some examples, the target motion is a measured motion of the second user.

The robot 200 further comprises control circuitry 240 configured to control movement of the robot arm 210 based on the target motion. The control circuitry 240 may be integrated into a microcontroller or programmable logic controller. The control circuitry 240 may control the movement of the robot arm 210 based on any suitable control mechanism, e.g., closed-loop control, feedback control, linear or proportional control. The control circuitry 240 may be configured to control movement of the robot arm 210 such that the robot arm 210 performs the target motion. The control circuitry 240 may direct a machine-readable command to an actuator of the robot arm 210 for controlling the movement.

For instance, the robot arm 210 may comprise an actuator which is controllable by the control circuitry 240. Depending on the type of the target motion (e.g., hugging or stroking), the control circuitry 240 may control a control parameter of the actuator, e.g., an air pressure in case of a pneumatic actuator. The control circuitry 240 may use the motion control data 230 to navigate the robot arm 210.

In some examples, the input interface circuitry 220 is configured to receive first input data indicative of at least one of a motion of the first user, a position of the first user, a counterforce of the first user against the robot arm and settings of the first user and the control circuitry 240 is further configured to control the movement of the robot arm based on the first input data, e.g., adapt a speed or force of the target motion. The robot 200 may comprise at least one sensor to measure the motion, position or counterforce. The input interface circuitry 220 may be configured to continuously, e.g., in predetermined time intervals, receive updated first input data, especially, updated information about the motion, position, or counterforce of the first user. The control circuitry 240 may, then, modify the target motion based on the motion, the position, the counterforce and/or the settings of the first user. Operations such as updating and transmitting the first input data and controlling the movement according to the (updated) first input data may be based on a real-time system, i.e., the real-time system may ensure the operations to have response times within a specified time (e.g., few milliseconds). The modification of the target motion may allow an implementation of a feedback control system, e.g., for safety reasons or for determining how the movement of the robot arm 210 is to be performed relative to the first user. In particular, the robot 200 may be configured such that the usage of the robot 200 by the first user does not negatively interfere with the first user (e.g., hurt, press too hard or unintentionally detain the first user). Besides, a breathing motion of the first user may be captured and integrated into the target motion, e.g., the control circuitry 240 may modify the target motion such that the underlying breathing motion pattern of the second user is synchronized to the breathing motion of the first user. The latter may enable bio synchronization between the first user and the second user. Further, the settings of the first user may allow a modification of the target motion according to individual preferences of the first user.

In some examples, the robot arm 210 comprises at least one sensor configured to determine a counterforce of the first user against the robot arm. The sensor may be a pressure sensor, for instance. The control circuitry 240 may be further configured to control the movement of the robot arm 210 based on the determined counterforce. In some examples, the robot arm 210 comprises a plurality of sensors configured to determine a respective counterforce of the first user against the robot arm 210. A resolution or number of the sensors may increase along the robot arm 210 towards a robot hand of the robot arm 210. For instance, the robot arm 210 may be equipped with a grid of pressure sensors with increasing resolution of the sensors towards the distal direction (towards the robot hand) and with highest resolution in the robot hand (e.g., a resolution of up to 2 square millimeter). The control circuitry 240 may be further configured to control the movement of the robot arm 210 based on the determined counterforces.

In some examples, the input interface circuitry 220 is further configured to receive second motion control data indicative of the breathing motion pattern of the second user. The robot 200 may further comprise a robot chest comprising a hydraulic actuator or a pneumatic actuator. The robot chest may be a chest-like part of the robot 200 (e.g., a physical part with a size and/or shape similar to a human chest) to which the robot arm 210 is mechanically connected. The control circuitry 240 may be further configured to control the hydraulic actuator or the pneumatic actuator based on the breathing motion pattern. In other words, the actuator may move the robot chest to imitate a breathing motion represented by the breathing motion pattern. The actuators may, e.g., periodically inflate and deflate the robot chest according to a breathing rhythm indicated by the breathing motion pattern.

In some examples, the input interface circuitry 220 is further configured to receive second input data indicative of a heartbeat pattern of the second user. The robot 200 may further comprise a vibration actuator. The vibration actuator may be, e.g., an electric motor with an unbalanced mass on its driveshaft (eccentric rotating mass actuator). The control circuitry 240 may be further configured to control the vibration actuator based on the heartbeat pattern. The control circuitry 240 may control the vibration actuator such that it generates vibrations imitating a heartbeat of the second user (which is represented by the heartbeat pattern), i.e., such that it generates periodic vibration pulses according to a rhythm of the heartbeat of the second user. In some examples, the heartbeat pattern correlates with the breathing motion pattern of the second user. For instance, an apparatus for generating the motion control data 230, such as apparatus 100, may modify the heartbeat pattern based on the breathing motion pattern, e.g., clinch or stretch heartbeat pulses depending on a concurrent section (phase) of the breathing motion pattern, and/or synchronize the heartbeat pattern with the breathing motion pattern.

In some examples, the robot 200 further comprises a heating device. The heating device may be capable of converting an input energy form into heat energy. The heating device may be an electric heater, for instance, and may comprise an electrical resistor or an infrared light for producing heat. The input interface circuitry 220 may be further configured to receive temperature control data indicative of a target temperature to be regulated on by the heating device. The control circuitry 240 may be further configured to control the heating device based on the target temperature. Thus, the control circuitry 240 may regulate the output temperature of the heating device to the target temperature, e.g., based on a closed or open loop control mechanism. In some examples, the target temperature corresponds to a measured body temperature of the second user.

In some examples the input interface circuitry 220 is further configured to receive third input data indicative of a phonation of the second user. The robot 200 may further comprise an audio device configured to output the phonation of the second user. The audio device may be a speaker, for instance. The third input data may be an audio signal. Optionally, the audio device may be configured to process the third input data, e.g., to remove background sound and noise of the audio signal, to extract the phonation. In this manner, the robot 200 may enable additional audio communication between the first user and the second user.

In some examples, the robot 200 may be operated in different operation modes, e.g., the robot 200 may temporally operate in a restricted operation mode or a calibration mode. While the robot 200 operates in the restricted operation mode, the control circuitry 240 may be configured to control the robot arm 210 not to perform the target motion. During the restricted operation mode, the robot 200 may still imitate a breathing motion according to the breathing motion pattern or to imitate a heartbeat of the second user according to a heartbeat pattern or output an audio signal comprising a phonation of the second user. This may enable the first user to change a status of the robot 200, e.g., in case the first user does not want to be disturbed or wants to stop a haptical communication with the second user via the robot 200. The robot 200 may comprise output interface circuitry configured to send output data indicating the status (operation mode) of the robot 200 to a device used by the second user.

In some examples, the robot 200 further comprises second input interface circuitry and, while the robot 200 operates in a calibration mode, the second input interface circuitry is configured to receive fourth input data indicative of an instruction of the first user to set a maximum force to be applied to the first user by the robot arm 210. The second input interface circuitry may be coupled to a user interface which may generate the fourth input data based on, e.g., speech or gesture recognition or text input. The calibration mode may be initiated by the first user via the user interface. The robot 200 may further comprise a data storage configured to store the maximum force. The control circuitry 240 may be configured to control the movement of the robot arm 210 based on the maximum force. The control circuitry 240 may control the movement such that a measured counterforce of the first user against the robot arm 210 caused by its movement does not exceed the maximum force. This may enable individual adaption of the usage of the robot 200 which is, in particular, beneficial in cases where the first user is a child in growth, a pregnant woman or where the first user has changed in physical condition, e.g., has a changed in pain sensitivity or muscle strength. The calibration may be performed for several types of motion, e.g., for soft or strong hugs. In the latter case, the data storage may be configured to store a respective maximum force for each type of motion. The robot 200 may be configured to recognize the first user, e.g., based on a facial or speech recognition system. In the latter case, the data storage may be configured to store the maximum force associated with an identifier assigned to the first user.

The robot 200 may enable a realistic imitation of a motion of a living being. The robot 200 may move according to a predetermined voluntary motion combined with a breathing motion pattern, i.e., the robot 200 may allow a more intelligible and natural transmission of a message (visually or haptically) represented by the motion. The robot 200 may convey a more immersive impression of a presence of a second user to the first user, thus, the robot 200 may enable nonverbal communication (e.g., via touch or gesture) between the first user and the second user. Optionally, the robot 200 may allow a transmission of the motion in combination with other physiological parameters like heartbeat or body temperature. The robot 200 may improve an authenticity of an interaction between a first user and the second user via the robot, e.g., for transferring a hug or other kind of endearment from the second user to the first user.

A possible use case of the robot 200 may be remote communication: The first user and the second user may be a couple or a parent and a kid (e.g., an early born baby) which are separated physically (e.g., because of a business trip, school trip, stay in quarantine, hospital stays, or alike). The robot 200 may enable a connection and interaction of the first user and the second user beyond mere video or audio transmission. For example, parents could use the robot 200 to virtually hold the hands of their kids or hug them when they feel alone or sad. The robot 200 may enable virtual transmission of a motion and physiological parameters like heartbeat, body temperature or breathing which prevents the motion to appear artificial. In case of an early born baby being the first user, a connection via the robot 200 may help bonding between parents and the baby which increases survival chances of the early born.

Figure 3A:
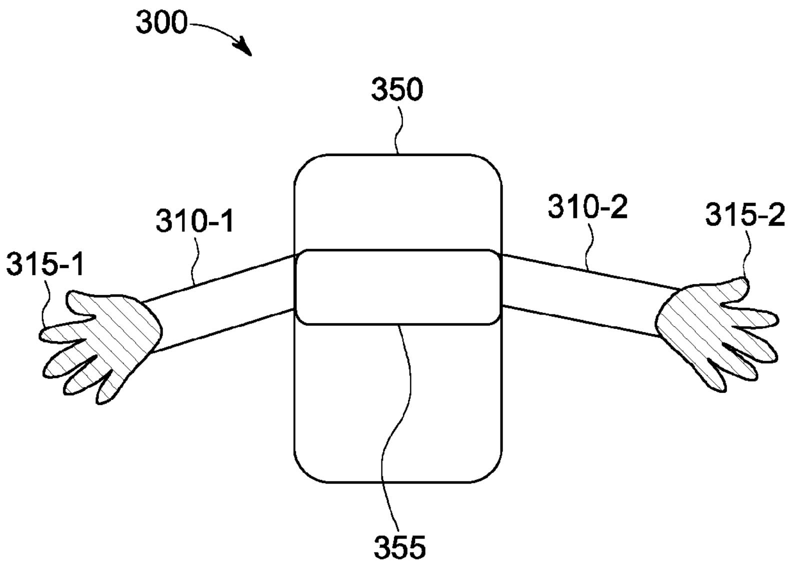
FIG. 3*a* to FIG. 3*c* illustrate another example of a robot in a neutral position, during a target motion of a first type, and during a target motion of a second type.
Figure 3B:
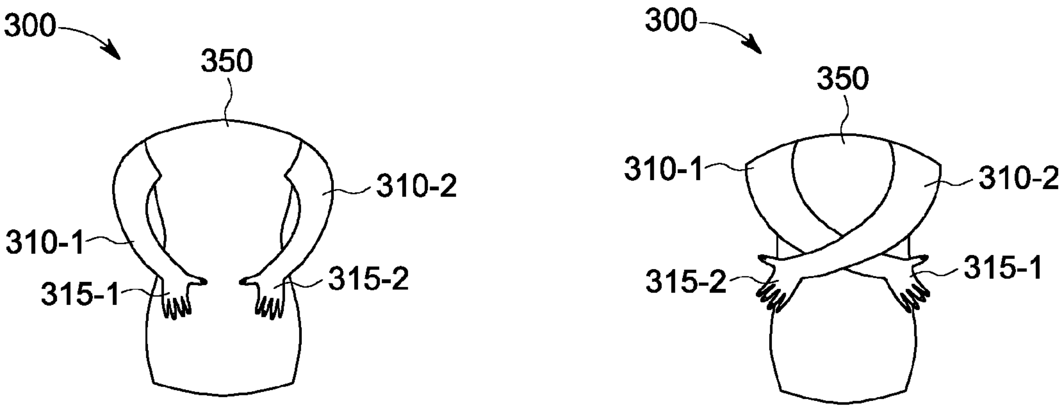
Figure 3C:

FIG. 3*a* to FIG. 3*c* illustrate a second example of a robot 300 in a neutral position (FIG. 3*a*), while performing a target motion of a first type, e.g., a hugging motion, (FIG. 3*b*) and while performing target motion of a second type, e.g., a stroking motion, (FIG. 3*c*). The robot 300 comprises a first robot arm 310-1 and a second robot arm 310-2, each of them comprising a respective robot hand, a first robot hand 315-1 and a second robot hand 315-2. The robot 300 comprises a robot body 350 with a robot chest 355. The robot 300 comprises input interface circuitry (not shown) configured to receive motion control data indicative of a target motion to be performed by the first and/or second robot arm 310-1 and 310-2 relative to a first user (not shown). The target motion correlates with a breathing motion pattern of a second user. The robot 300 further comprises control circuitry (not shown) configured to control movement of the first and/or second robot arm 310-1 and 3100-2 based on the target motion.

In FIG. 3*b*, the target motion is an enclosing of an upper body of the first user with the robot arms 310-1 and 310-2. In FIG. 3*c*, the target motion is a movement of the robot hands 315-1 and 315-2 along a surface of the first user.

The robot arms 310-1 and 310-2 may comprise at least one sensor configured to determine a counterforce of the first user against the respective robot arm 310-1 and 310-2. The control circuitry may be further configured to control the movement of the robot arms 310-1 and 310-2 based on the determined counterforce. The robot arms 310-1 and 310-2 may comprise a plurality of sensors configured to determine a respective counterforce of the first user against the robot arms 310-1 and 310-2. A resolution or number of the sensors may increase along the robot arms 310-1 and 310-2 towards a respective robot hand 315-1 or 315-2 of the robot arms 310-1 and 310-2. The control circuitry may be further configured to control the movement of the robot arms 310-1 and 310-2 based on the determined counterforces.

For instance, the robot 300 may be equipped with sensors for sensing touch to create a safe medium for a first user using the robot 300. For instance, the robot chest 355 may be equipped with multiple pressure sensors (or a pressure sensor grid) for detecting tissue touching the robot chest 355. A resolution of these sensors may be relatively low (e.g., up to 5 square centimeter). The robot arms 310-1 and 310-2 may be equipped with pressure sensors (or a grid) with an increasing resolution of the sensors towards the distal direction (towards the robot hands 315-1 and 315-2) with highest resolution in the hand region (e.g., up to 2 square millimeter). These sensors may generate measurement data for estimating a position of the first user. This may enable control of small movements relative to the first user like holding hands or caress.

The robot arms 310-1 and 310-2 may be controlled by the control circuitry for being bent into predefined positions according to natural degrees of freedom and depending on the target motion, e.g., selected by the second user. The robot hands 315-1 and 315-2 may have more degrees of freedom than the robot arms 310-1 and 310-2. The movements may be performed by pneumatic or hydraulic actuators integrated into the robot arms 310-1 and 310-2 or robot hands 315-1 and 315-2.

The input interface circuitry may be further configured to receive second motion control data indicative of the breathing motion pattern of the second user. The robot chest 355 may comprise a hydraulic actuator or a pneumatic actuator. The control circuitry may be further configured to control the hydraulic actuator or the pneumatic actuator based on the breathing motion pattern. The input interface circuitry may be further configured to receive second input data indicative of a heartbeat pattern of the second user. The robot 300 may further comprise a vibration actuator. The control circuitry may be further configured to control the vibration actuator based on the heartbeat pattern. The heartbeat pattern may correlate with the breathing motion pattern of the second user. The robot 300 may further comprise a heating device. The input interface circuitry may be further configured to receive temperature control data indicative of a target temperature to be regulated on by the heating device. The control circuitry may be further configured to control the heating device based on the target temperature. The target temperature may correspond to a measured body temperature of the second user.

For instance, the robot chest 355 may be equipped with pneumatic and/or vibration actuators for imitating a breathing motion and/or heartbeat corresponding to the breathing motion pattern and the heartbeat pattern of the second user, respectively. The robot chest 355, the robot arms 310-1 and 310-2, the robot hands 315-1 and 315-2 may be equipped with heating devices which generate heat for imitating body temperature.

Figure 4:
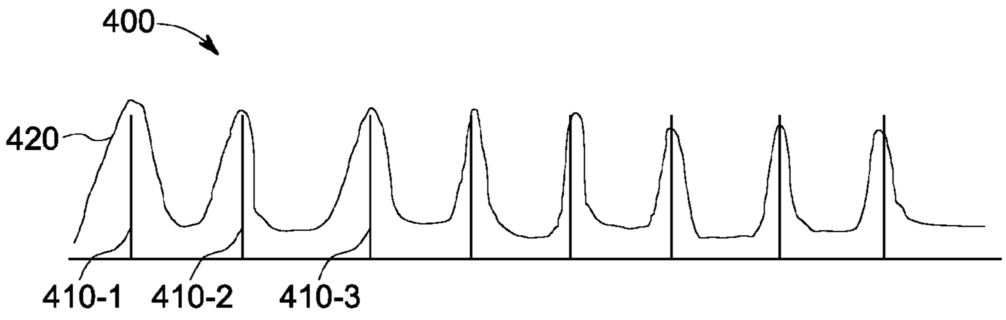
FIG. 4 illustrates a time series of an example of a heartbeat pattern.

FIG. 4 illustrates a time series 400 of an example of a heartbeat pattern. The time series 400 shows an intensity course (force) of the heartbeat pattern over time. The heartbeat pattern may be represented by input data received by an input interface circuitry of an apparatus according to the present disclosure, e.g., apparatus 100. Alternatively, the heartbeat pattern may be represented by input data received by an input interface circuitry of a robot according to the present disclosure, e.g., robot 200 or 300. The heartbeat pattern may be a mathematical representation of measured heartbeats of a living being (the second user). The time series 400 comprises heartbeat pulses, such as pulse 410-1, 410-2, and 410-3 which occur periodically over the illustrated timeline. The time series 400 shows a smoothed heartbeat pattern 420 which is a result of smoothing over the heartbeat pulses.

Figure 5:
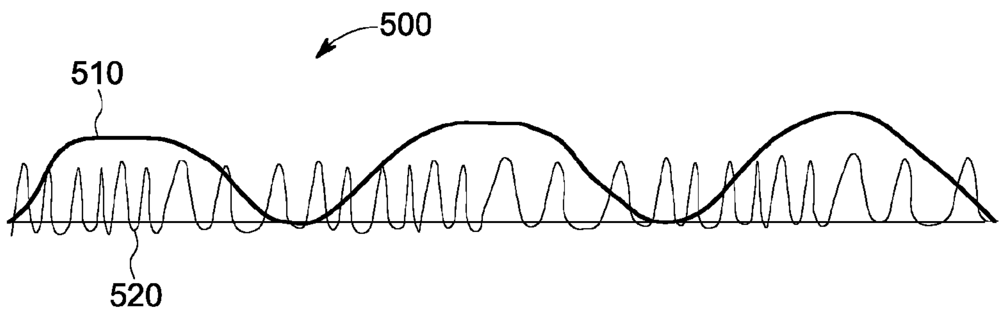
FIG. 5 illustrates a time series of an example of a breathing motion pattern and a heartbeat pattern.

FIG. 5 illustrates a time series 500 of an example of a breathing motion pattern 510 and an example of a heartbeat pattern 520. The time series 500 shows an intensity course of the breathing motion pattern 510 and an intensity course of the heartbeat pattern 520 over time. The breathing motion pattern 510 may be mathematical representation of measured, simulated and/or estimated breathing motions of a living being (the second user). The breathing motion pattern 520 may be represented by input data received by an input interface circuitry of an apparatus according to the present disclosure, e.g., apparatus 100. Alternatively, the breathing motion pattern 520 may be represented by input data received by an input interface circuitry of a robot according to the present disclosure, e.g., robot 200 or 300. Depending on a phase (section) of the breathing motion pattern 510 (inhalation or exhalation section), the heartbeat pattern 520 is clinched or stretched, respectively, which indicates effects of the baroreflex.

Figure 6:
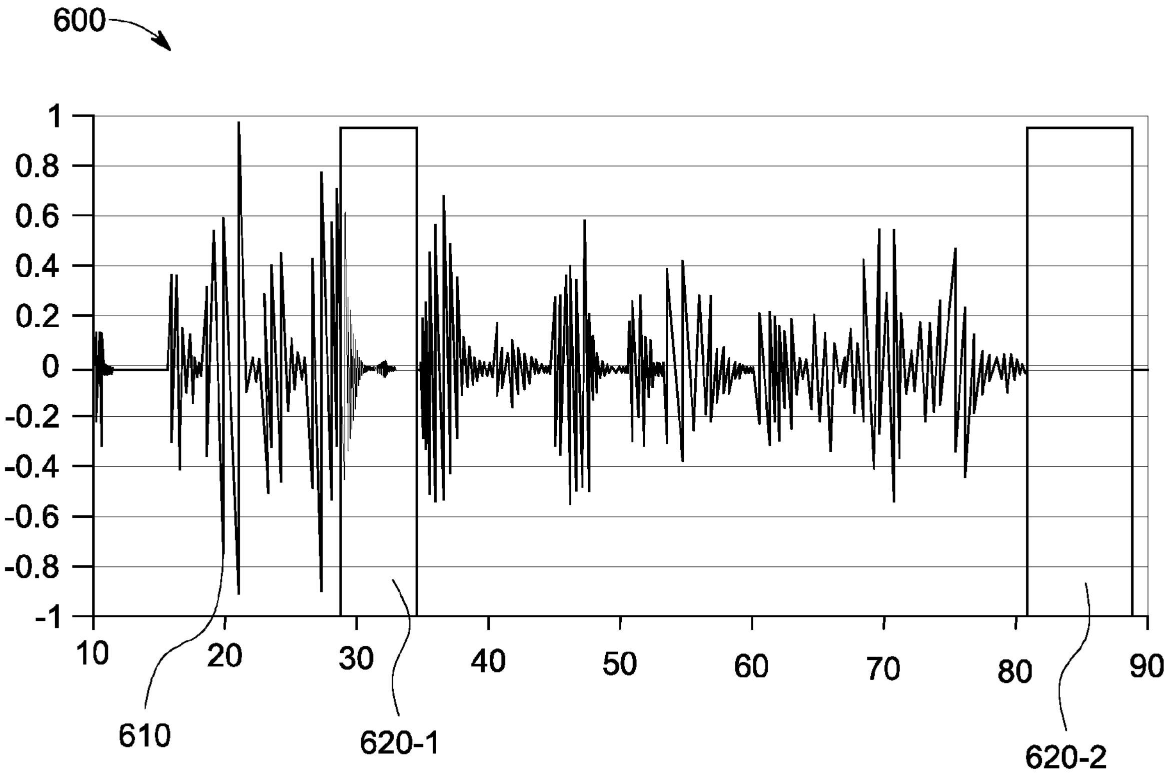
FIG. 6 illustrates a time series of an example of a phonation.

FIG. 6 illustrates a time series 600 of an example of a phonation of a second user. The time series 600 shows a spectrum of audio waveforms over time. The phonation may be a spectral representation of recorded speech or other sound produced by the second user. The phonation comprises sections of active phonation, e.g., active phonation section 610, and phonation breaks, e.g., phonation breaks 620-1 and 620-2, between sections of active phonation.

Figure 7:
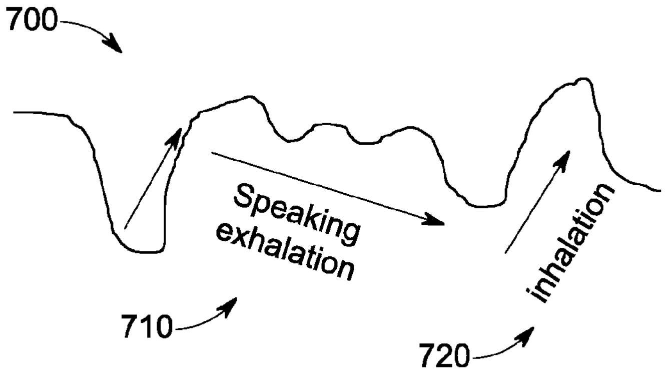
FIG. 7 illustrates a time series of an example of a breathing motion pattern modified based on an example of a phonation.

FIG. 7 illustrates a time series 700 of an example of a breathing motion pattern modified based on phonation. For instance, an apparatus for generating motion control data, such as apparatus 100, may be configured to modify a breathing motion pattern based on a phonation prior to modifying a target motion. The modified breathing motion pattern comprises an exhalation section 710 which is modified based on a correlation between a duration of the exhalation section 710 with a duration of the phonation. For instance, the duration of the exhalation section 710 has been adapted to the duration of the phonation. The modified breathing motion pattern comprises an inhalation section 720 which is modified based on a correlation between a duration of the inhalation section 720 and a duration of a phonation break.

Figure 8A:
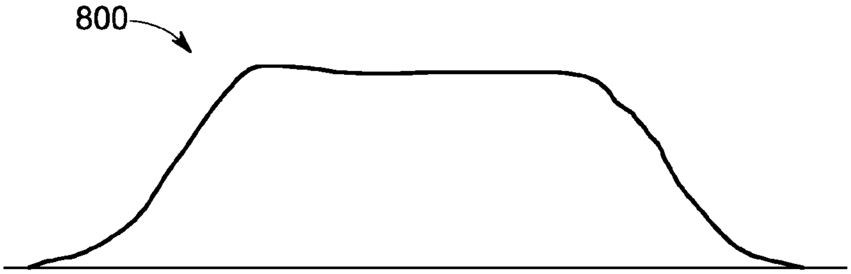
FIG. 8*a* and FIG. 8*b* illustrate a time series of an example of a target motion and an example of a target motion modified based on a breathing motion pattern.
Figure 8B:
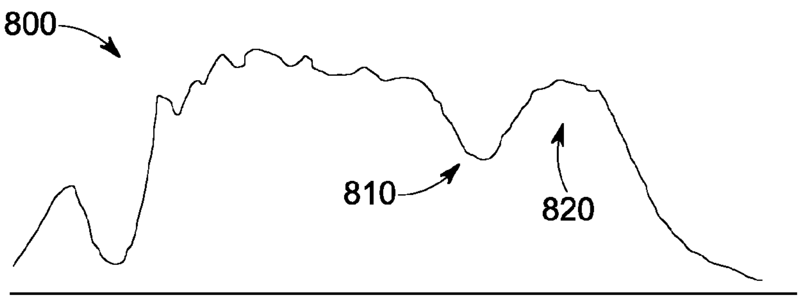

FIG. 8*a* and FIG. 8*b* illustrate a time series 800 of an example of a target motion (FIG. 8*a*) and the target motion modified based on a breathing motion (FIG. 8*b*). The time series 800 illustrates a force of the target motion over time. The target motion may be an enclosing of an upper body of a first user (i.e., a hugging motion) by a robot arm. In FIG. 8*a*, the time series 800 shows an increase of force (beginning of target motion), followed by a relative constant force (holding) and a decrease of force (end of target motion). In FIG. 8*b*, the target motion is modified by convolving the target motion illustrated by FIG. 8*a* with a breathing motion pattern, e.g., the breathing motion pattern illustrated by FIG. 7. In FIG. 8*b*, the time series 800 shows a more unsteady course of the force over time than in force illustrated in FIG. 8*a*. The unsteadiness corresponds to jitter in the breathing motion pattern. Further, the modified target motion exhibits a drop of force which corresponds to an exhalation section of the breathing motion pattern and an increase of force which corresponds to an inhalation section of the breathing motion pattern.

Figure 9:
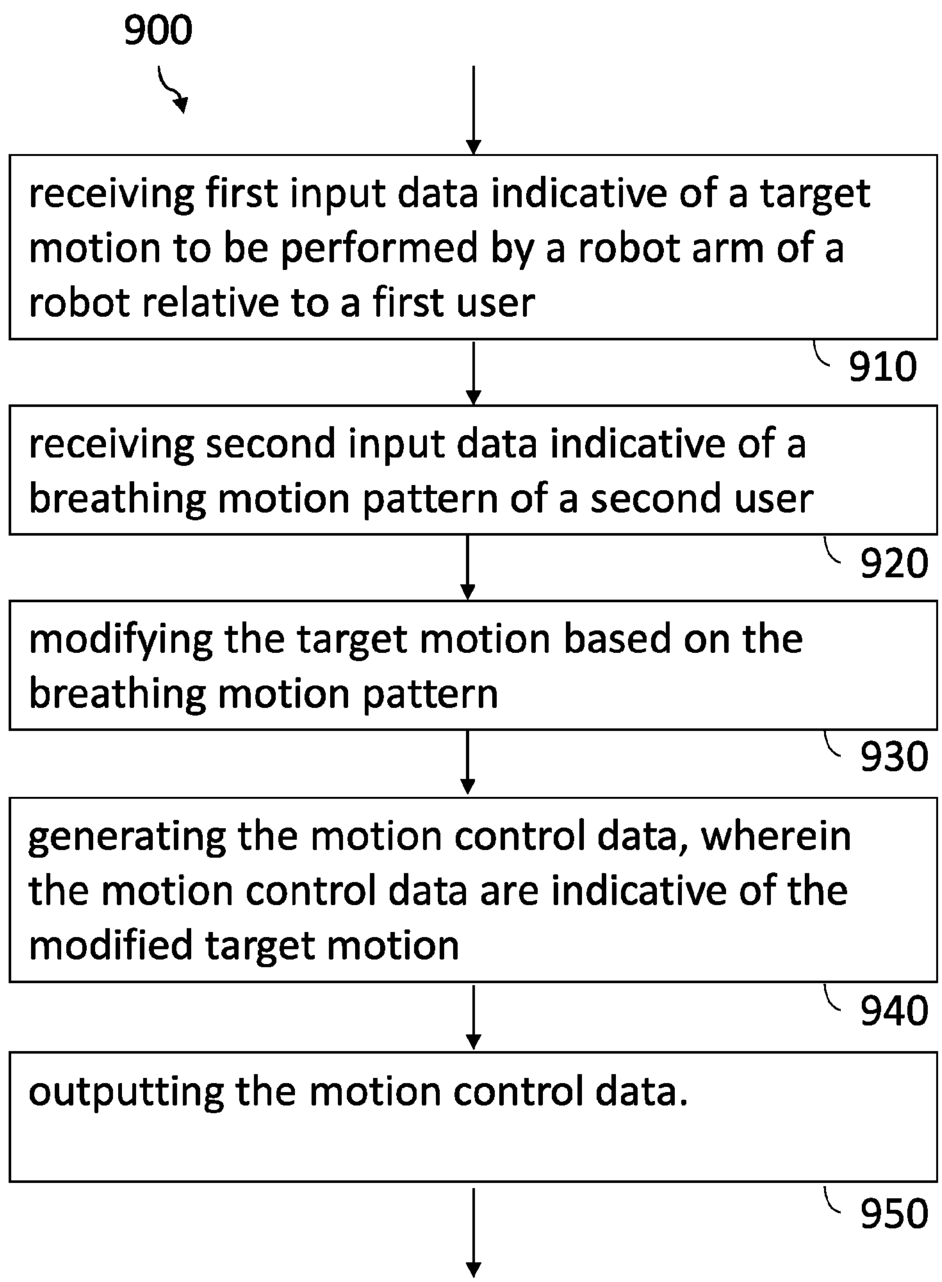
FIG. 9 illustrates a flowchart of an example of a method for generating motion control data for a robot.

FIG. 9 illustrates a flowchart of an example of a method 900 for generating motion control data for a robot. The method 900 comprises receiving 910 first input data indicative of a target motion to be performed by a robot arm of the robot relative to a first user, receiving 920 second input data indicative of a breathing motion pattern of a second user and modifying 930 the target motion based on the breathing motion pattern. The method 900 further comprises generating 940 the motion control data, wherein the motion control data are indicative of the modified target motion, and outputting 950 the motion control data.

Figure 10:
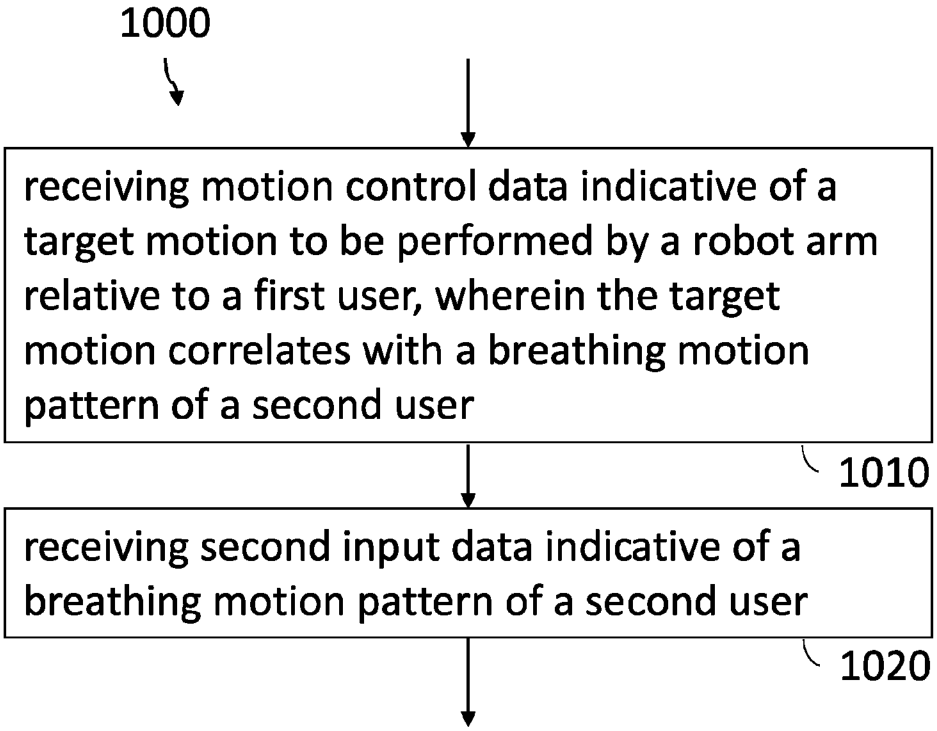
FIG. 10 illustrates a flowchart of an example of a method for controlling a robot.

FIG. 10 illustrates a flowchart of an example of a method 1000 for controlling a robot. The method 1000 comprises receiving 1010 motion control data indicative of a target motion to be performed by the robot arm relative to a first user, wherein the target motion correlates with a breathing motion pattern of a second user. The method 1000 further comprises controlling 1020 movement of a robot arm of the robot based on the target motion.

More details and aspects of the method 900 and the method 1000 are explained in connection with the proposed technique or one or more examples described above, e.g., with reference to FIG. 1 and FIG. 2. The method 900 and the method 1000 may comprise one or more additional optional features corresponding to one or more aspects of the proposed technique, or one or more examples described above.

Apparatuses and methods disclosed herein may increase a naturalness of a motion performed by a robot. They may enable a more immersive virtual transmission of the motion via the robot. In other words, they may allow a realistic imitation of a motion of a human. They may modify a voluntary motion, such as hugging or stroking, based on an involuntary motion, such as a breathing motion, to increase the naturalness. Optionally, the apparatuses and methods may allow transmission of physiological parameters of a human, such as heartbeats and body temperature.

The following examples pertain to further embodiments:

(1) An apparatus for generating motion control data for a robot. The apparatus comprises input interface circuitry configured to receive first input data indicative of a target motion to be performed by a robot arm of the robot relative to a first user and receive second input data indicative of a breathing motion pattern of a second user. The apparatus further comprises processing circuitry configured to modify the target motion based on the breathing motion pattern and generate the motion control data, wherein the motion control data are indicative of the modified target motion. The apparatus further comprises output interface circuitry configured to output the motion control data.

(2) The apparatus of (1), wherein the input interface circuitry is further configured to receive third input data indicative of a phonation of the second user, and wherein the processing circuitry is further configured to modify the breathing motion pattern based on the phonation prior to modifying the target motion.

(3) The apparatus of (2), wherein the processing circuitry is further configured to determine, based on the third input data, at least one of a predicted phonation and a predicted phonation break using a trained machine learning model, and wherein the processing circuitry is further configured to modify the breathing motion pattern based on the at least one of the predicted phonation and the predicted phonation break.

(4) The apparatus of (2) or (3), wherein the breathing motion pattern comprises an inhalation exhalation section, wherein the processing circuitry is configured to modify the breathing motion pattern by correlating a duration of the inhalation exhalation section with a duration of the phonation.

(5) The apparatus of any one of (1) to (4), wherein the processing circuitry is configured to modify the target motion by convolving the target motion and the breathing motion pattern.

(6) The apparatus of any one of (1) to (5), wherein the input interface circuitry is further configured to receive fourth input data indicative of a heartbeat pattern of the second user, wherein the processing circuitry is configured to modify the heartbeat pattern based on the breathing motion pattern, and wherein the output interface circuitry is further configured to output the modified heartbeat pattern.

(7) The apparatus of (6), wherein the breathing motion pattern comprises an inhalation section and an exhalation section, wherein the processing circuitry is configured to modify the heartbeat pattern by clinching a first part of the heartbeat pattern corresponding to the inhalation section and stretching a second part of the heartbeat pattern corresponding to the exhalation section.

(8) The apparatus of any one of (1) to (7), wherein the target motion is to be performed by an actuator of the robot arm, wherein the processing circuitry is configured to modify the target motion based on a weighting of the breathing motion pattern, and wherein the weighting corresponds to a position of the actuator along the robot arm.

(9) The apparatus of any one of (1) to (8), wherein the input interface circuitry is further configured to receive fifth input data indicative of at least one of a motion of the first user, a position of the first user, a counterforce of the first user against the robot arm and settings of the first user, and wherein the processing circuitry is further configured to modify the target motion based on the fifth input data.

(10) The apparatus of any one of (1) to (9), wherein the first input data indicate at least one of a type of the target motion, a duration of the target motion and a target force to be applied on the first user by the robot arm.

(11) The apparatus of any one of (1) to (10), wherein the output interface circuitry is further configured to output second motion control data indicative of the breathing motion pattern.

(12) The apparatus of any one of (1) to (11), wherein the input interface circuitry is further configured to receive sixth input data indicative of a target temperature to be regulated on by a heating device of the robot, and wherein the output interface circuitry is further configured to output temperature control data indicative of the target temperature.

(13) The apparatus of (12), wherein the target temperature corresponds to a measured body temperature of the second user.

(14) The apparatus of any one of (1) to (13), wherein the target motion is at least one of an enclosing of an upper body of the first user with the robot arm and a movement of a robot hand of the robot arm along a surface of the first user.

(15) The apparatus of any one of (1) to (14), wherein the target motion is a measured motion of the second user.

(16) A robot comprising a robot arm and input interface circuitry configured to receive motion control data indicative of a target motion to be performed by the robot arm relative to a first user. The target motion correlates with a breathing motion pattern of a second user. The robot further comprises control circuitry configured to control movement of the robot arm based on the target motion.

(17) The robot of (16), wherein the input interface circuitry is further configured to receive second motion control data indicative of the breathing motion pattern of the second user, wherein the robot further comprises a robot chest comprising a hydraulic actuator or a pneumatic actuator, wherein the control circuitry is further configured to control the hydraulic actuator or the pneumatic actuator based on the breathing motion pattern.

(18) The robot of (16) or (17), wherein the input interface circuitry is configured to receive first input data indicative of at least one of a motion of the first user, a position of the first user, a counterforce of the first user against the robot arm and settings of the first user, and wherein the control circuitry is further configured to control the movement of the robot arm based on the first input data.

(19) The robot of any one of (16) to (18), wherein the input interface circuitry is further configured to receive second input data indicative of a heartbeat pattern of the second user, wherein the robot further comprises a vibration actuator, and wherein the control circuitry is further configured to control the vibration actuator based on the heartbeat pattern.

(20) The robot of (19), wherein the heartbeat pattern correlates with the breathing motion pattern of the second user.

(21) The robot of any one of (16) to (20), wherein the robot further comprises a heating device, wherein the input interface circuitry is further configured to receive temperature control data indicative of a target temperature to be regulated on by the heating device, and wherein the control circuitry is further configured to control the heating device based on the target temperature.

(22) The robot of (21), wherein the target temperature corresponds to a measured body temperature of the second user.

(23) The robot of any one of (16) to (22), wherein the input interface circuitry is further configured to receive third input data indicative of a phonation of the second user, and wherein the robot further comprises an audio device configured to output the phonation of the second user.

(24) The robot of any one of (16) to (23), wherein the robot arm comprises at least one sensor configured to determine a counterforce of the first user against the robot arm, and wherein the control circuitry is further configured to control the movement of the robot arm based on the determined counterforce.

(25) The robot of any one of (16) to (23), wherein the robot arm comprises a plurality of sensors configured to determine a respective counterforce of the first user against the robot arm, wherein a resolution or number of the sensors increases along the robot arm towards a robot hand of the robot arm, and wherein the control circuitry is further configured to control the movement of the robot arm based on the determined counterforces.

(26) The robot of any one of (16) to (25), wherein the target motion is at least one of an enclosing of an upper body of the first user with the robot arm and a movement of a robot hand of the robot arm along a surface of the first user.

(27) The robot of any one of (16) to (26), wherein the target motion is a measured motion of the second user.

(28) The robot of any one of (16) to (27), wherein the motion control data indicate at least one of a type of the target motion, a duration of the target motion and a target force to be applied on the first user by the robot arm.

(29) The robot of any one of (16) to (28), wherein, while the robot operates in a restricted operation mode, the control circuitry is configured to control the robot arm not to perform the target motion.

(30) The robot of any one of (16) to (29), further comprising second input interface circuitry, wherein, while the robot operates in a calibration mode, the second input interface circuitry is configured to receive fourth input data indicative of an instruction of the first user to set a maximum force to be applied on the first user by the robot arm, wherein the robot further comprises a data storage configured to store the maximum force, and wherein the control circuitry is configured to control the movement of the robot arm based on the maximum force.

(31) A method for generating motion control data for a robot. The method comprises receiving first input data indicative of a target motion to be performed by a robot arm of the robot relative to a first user, receiving second input data indicative of a breathing motion pattern of a second user, modifying the target motion based on the breathing motion pattern, generating the motion control data, wherein the motion control data are indicative of the modified target motion, and outputting the motion control data.

(32) A method for controlling a robot. The method comprises receiving motion control data indicative of a target motion to be performed by the robot arm relative to a first user, wherein the target motion correlates with a breathing motion pattern of a second user, and controlling movement of a robot arm of the robot based on the target motion.

(33) A non-transitory machine-readable medium having stored thereon a program having a program code for performing the method of (31) or (32), when the program is executed on a processor or a programmable hardware.

(34) A program having a program code for performing the method of (31) or (32), when the program is executed on a processor or a programmable hardware.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for generating motion control data for a robot, comprising:

input interface circuitry configured to:

receive first input data indicative of a target motion to be performed by a robot arm of the robot relative to a first user;

receive second input data indicative of a breathing motion pattern of a second user; and receive third input data indicative of a phonation of the second user;

processing circuitry configured to:

modify the breathing motion pattern based on the phonation;

modify the target motion based on the modified breathing motion pattern; and generate the motion control data, wherein the motion control data are indicative of the modified target motion; and output interface circuitry configured to output the motion control data.

2. The apparatus of claim 1, wherein the processing circuitry is further configured to determine, based on the third input data, at least one of a predicted phonation and a predicted phonation break using a trained machine learning model, and wherein the processing circuitry is further configured to modify the breathing motion pattern based on the at least one of the predicted phonation and the predicted phonation break.

3. The apparatus of claim 1, wherein the breathing motion pattern comprises an exhalation section, wherein the processing circuitry is configured to modify the breathing motion pattern by correlating a duration of the exhalation section with a duration of the phonation.

4. The apparatus of claim 1, wherein the processing circuitry is configured to modify the target motion by convolving the target motion and the breathing motion pattern.

5. The apparatus of claim 1, wherein the input interface circuitry is further configured to receive fourth input data indicative of a heartbeat pattern of the second user, wherein the processing circuitry is configured to modify the heartbeat pattern based on the breathing motion pattern, and wherein the output interface circuitry is further configured to output the modified heartbeat pattern.

6. The apparatus of claim 5, wherein the breathing motion pattern comprises an inhalation section and an exhalation section, wherein the processing circuitry is configured to modify the heartbeat pattern by clinching a first part of the heartbeat pattern corresponding to the inhalation section and stretching a second part of the heartbeat pattern corresponding to the exhalation section.

7. The apparatus of claim 1, wherein the target motion is to be performed by an actuator of the robot arm, wherein the processing circuitry is configured to modify the target motion based on a weighting of the breathing motion pattern, and wherein the weighting corresponds to a position of the actuator along the robot arm.

8. The apparatus of claim 1, wherein the input interface circuitry is further configured to receive fifth input data indicative of at least one of a motion of the first user, a position of the first user, a counterforce of the first user against the robot arm and settings of the first user, and wherein the processing circuitry is further configured to modify the target motion based on the fifth input data.

9. The apparatus of claim 1, wherein the first input data indicate at least one of a type of the target motion, a duration of the target motion and a target force to be applied on the first user by the robot arm.

10. The apparatus of claim 1, wherein the output interface circuitry is further configured to output second motion control data indicative of the breathing motion pattern.

11. The apparatus of claim 1, wherein the input interface circuitry is further configured to receive sixth input data indicative of a target temperature to be regulated on by a heating device of the robot, and wherein the output interface circuitry is further configured to output temperature control data indicative of the target temperature.

12. The apparatus of claim 11, wherein the target temperature corresponds to a measured body temperature of the second user.

13. An apparatus for generating motion control data for a robot, comprising:
input interface circuitry configured to:
receive first input data indicative of a target motion to be performed by a robot arm of the robot relative to a first user; and
receive second input data indicative of a breathing motion pattern of a second user;
processing circuitry configured to:
modify the target motion based on the breathing motion pattern; and
generate the motion control data, wherein the motion control data are indicative of the modified target motion; and
output interface circuitry configured to output the motion control data, wherein
the target motion is at least one of an enclosing of an upper body of the first user with the robot arm and a movement of a robot hand of the robot arm along a surface of the first user.

14. The apparatus of claim 1, wherein the target motion is a measured motion of the second user.

15. A robot, comprising:
a robot arm;
a robot chest comprising a hydraulic actuator or a pneumatic actuator;
input interface circuitry configured to:
receive motion control data indicative of a target motion to be performed by the robot arm relative to a first user, wherein the target motion correlates with a breathing motion pattern of a second user; and
receive second motion control data indicative of the breathing motion pattern of the second user; and
control circuitry configured to:
control movement of the robot arm based on the target motion; and
control the hydraulic actuator or the pneumatic actuator based on the breathing motion pattern.

16. The robot of claim 15, wherein the input interface circuitry is configured to receive first input data indicative of at least one of a motion of the first user, a position of the first user, a counterforce of the first user against the robot arm and settings of the first user, and wherein the control circuitry is further configured to control the movement of the robot arm based on the first input data.

17. The robot of claim 15, wherein the input interface circuitry is further configured to receive second input data indicative of a heartbeat pattern of the second user, wherein the robot further comprises a vibration actuator, and wherein the control circuitry is further configured to control the vibration actuator based on the heartbeat pattern.

18. The robot of claim 17, wherein the heartbeat pattern correlates with the breathing motion pattern of the second user.

* * * * *